United States Patent
Matuonto et al.

(10) Patent No.: US 12,140,122 B2
(45) Date of Patent: Nov. 12, 2024

(54) WIND TURBINE ELECTRICAL POWER GENERATING SYSTEM

(71) Applicant: Siemens Gamesa Renewable Energy Innovation & Technology S.L., Sarriguren (ES)

(72) Inventors: Marco Matuonto, Vizcaya (ES); José Luis Rodriguez Izal, Burlada (ES); Erhan Demirok, Izmir (TR)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 91 days.

(21) Appl. No.: 17/919,600

(22) PCT Filed: Apr. 27, 2021

(86) PCT No.: PCT/EP2021/060941
§ 371 (c)(1),
(2) Date: Oct. 18, 2022

(87) PCT Pub. No.: WO2021/219610
PCT Pub. Date: Nov. 4, 2021

(65) Prior Publication Data
US 2023/0160365 A1 May 25, 2023

(30) Foreign Application Priority Data
Apr. 27, 2020 (EP) .................................. 20382340

(51) Int. Cl.
*F03D 9/25* (2016.01)
(52) U.S. Cl.
CPC .... *F03D 9/255* (2017.02); *F05B 2220/70646* (2013.01); *F05B 2220/7068* (2013.01); *F05B 2260/4031* (2013.01)

(58) Field of Classification Search
CPC ............ F03D 9/255; F05B 2220/70646; F05B 2220/7068; F05B 2260/4031; F05B 2240/40; Y02E 10/72; Y02E 10/76
See application file for complete search history.

(56) References Cited

U.S. PATENT DOCUMENTS

| | | | | |
|---|---|---|---|---|
| 4,585,950 A | * | 4/1986 | Lund ........................ | F03D 9/25 416/DIG. 4 |
| 5,083,039 A | * | 1/1992 | Richardson ............. | H02J 3/381 290/55 |

(Continued)

FOREIGN PATENT DOCUMENTS

| | | | |
|---|---|---|---|
| CN | 105 932 714 A | 9/2016 | |
| EP | 1561945 A2 * | 8/2005 | ........... F03D 7/0224 |

(Continued)

OTHER PUBLICATIONS

International Search Report & Written Opinion for PCT/EP2021/060941, mailed on Jul. 1, 2021.

(Continued)

*Primary Examiner* — Pedro J Cuevas
(74) *Attorney, Agent, or Firm* — Schmeiser, Olsen & Watts LLP

(57) ABSTRACT

A wind turbine electrical power generating system includes a first generator configured to be mechanically coupled to a rotor, a second generator configured to be mechanically coupled to the rotor; and an electrical power conversion system including at least a first and a second power converter section. The first power converter section is electrically coupled between a rotor winding of the first generator and a coupling point and a stator winding of the first generator is electrically coupled to the coupling point such that only a fraction of electrical power generated by the first generator passes through the power conversion system. The second power converter section is electrically coupled (Continued)

between an electrical power output of the second generator and the coupling point such that the electrical power provided by the second generator to the coupling point passes through the power conversion system.

15 Claims, 4 Drawing Sheets

(56) References Cited

U.S. PATENT DOCUMENTS

| | | | | |
|---|---|---|---|---|
| 6,304,002 | B1* | 10/2001 | Dehlsen | F03D 15/00 310/75 R |
| 7,042,110 | B2* | 5/2006 | Mikhail | H02P 9/02 290/40 C |
| 7,069,802 | B2* | 7/2006 | Mikhail | F03D 15/10 74/665 GD |
| 7,687,929 | B2* | 3/2010 | Fattal | H02P 9/04 290/40 C |
| 7,786,608 | B2* | 8/2010 | Menke | F03D 7/0248 322/29 |
| 7,956,584 | B2* | 6/2011 | Peterson | H02P 9/48 290/40 C |
| 8,426,998 | B2* | 4/2013 | Lu | F03D 9/11 290/55 |
| 8,525,492 | B2* | 9/2013 | Peterson | H02P 9/48 290/40 C |
| 8,912,681 | B1* | 12/2014 | Filkins | F03D 15/00 290/55 |
| 9,500,182 | B2* | 11/2016 | Zagrodnik | H02J 3/381 |
| 9,991,763 | B1* | 6/2018 | Downs | H02K 7/116 |
| 11,378,062 | B2* | 7/2022 | Skaley | F16H 37/065 |
| 11,920,560 | B2* | 3/2024 | Lutz | B60K 17/12 |
| 2005/0012339 | A1* | 1/2005 | Mikhail | H02P 9/105 290/44 |
| 2006/0138780 | A1* | 6/2006 | Flamang | F16H 37/065 290/55 |
| 2012/0045328 | A1* | 2/2012 | Rashidi | F16L 41/03 137/561 A |
| 2013/0127172 | A1* | 5/2013 | Kimura | H02P 9/007 290/55 |
| 2013/0320938 | A1* | 12/2013 | Deng | H02K 7/09 322/90 |
| 2017/0279391 | A1* | 9/2017 | Freire | H02P 9/42 |

FOREIGN PATENT DOCUMENTS

| | | | | |
|---|---|---|---|---|
| EP | 2273107 | A1* | 1/2011 | F03D 7/0224 |
| EP | 2 653 720 | A2 | 10/2013 | |
| EP | 2 670 027 | A1 | 12/2013 | |
| EP | 2 919 380 | A1 | 9/2015 | |
| WO | 2005/046044 | A1 | 5/2005 | |

OTHER PUBLICATIONS

Fandi Ghaeth et al: "Modeling and simulation of a gearless variable speed wind turbine system with PMSG". 2017 IEEE PES Powerafrica, IEEE, Jun. 27, 2017 (Jun. 27, 2017), pp. 59-64.

* cited by examiner

WIND TURBINE ELECTRICAL POWER GENERATING SYSTEM

CROSS-REFERENCE TO RELATED APPLICATIONS

This application claims priority to PCT Application No. PCT/EP2021/060941, having a filing date of Apr. 27, 2021, which claims priority to EP Application No. 20382340.6, having a filing date of Apr. 27, 2020, the entire contents both of which are hereby incorporated by reference.

FIELD OF TECHNOLOGY

The following provides a wind turbine electrical power generating system and a respective wind turbine. Furthermore, a method of providing a wind turbine with an electrical power generating system is provided.

BACKGROUND

Modern variable speed wind turbines have several advantages over conventional fixed speed wind turbines. They in particular allow the extraction of more energy from wind at lower wind speeds. Two solutions have found widespread application: Doubly-fed induction generator (DFIG) solutions and Full Converter (FC) solutions. In the case of the DFIG solution, the stator of the generator is connected to the grid without any intervening power converter, whereas the rotor of such DFIG is connected to a power converter that can provide torque control. Such solution has advantages regarding the efficiency of power generation, since only a fraction of the generated electrical power has to pass through the power converter, thereby reducing losses. Furthermore, the power converter can be rated for lower powers, so that its size and costs are reduced. However, the capability of such DFIG solution to provide reactive power and to meet the current and more demanding grid codes needs to rely on more sophisticated control strategies and might not be ideal under certain borderline conditions. In particular, DFIG solutions provide limited reactive power capability in no wind conditions. Further, as the stator is more or less directly connected to the grid (via an intervening transformer), transients occurring on the grid are directly experienced by the stator. This can result in large mechanical and electrical stresses.

Alternatively, a so-called full converter (FC) solution is often employed. In such full converter solution, electrical power is generated by a permanent magnet synchronous generator (PMSG) the output of which is connected to a power converter. All of the produced electrical power thus passes through the power converter. This has the advantage that the active and reactive power output can be controlled very precisely over a wide operating range. Also, such solution can handle grid transients and as these are compensated (or at least significantly reduced prior to reaching the generator), mechanical loads can be reduced. On the other hand, since all of the produced electrical power passes through the converter, losses are higher than in the DFIG solution and the converter must have a higher power rating.

The document WO 2005/046044 A1 describes a machine including a power induction generator, a control induction generator connected to an inverter and a controller. The controller provides an output signal to the inverter so that in use, the inverter supplies electric power to the control induction generator to effect a selected output from the power induction generator.

The document EP 2 670 027 A1 describes a method and system for controlling a generator, wherein operating conditions, such as loads, noise emission or stress and efficiency are improved. The generator comprises at least first and second stator windings or segments, and both radial force and tangential force of the two generator segments can be separately controlled.

SUMMARY

An aspect relates to improved performance with respect to the power generation efficiency and the handling of grid transients.

According to an embodiment of the invention, a wind turbine electrical power generating system is provided. The power generating system comprises a first generator configured to be mechanically coupled to a rotor of the wind turbine to receive rotational mechanical energy from the rotor, and a second generator configured to be mechanically coupled to the rotor of the wind turbine to receive rotational mechanical energy from the rotor. It further includes an electrical power conversion system including at least a first power converter section and a second power converter section. The first power converter section is electrically coupled between a rotor winding of the first generator and a coupling point. A stator winding of the first generator is electrical coupled to the coupling point such that in operation, only a fraction of electrical power generated by the first generator passes through the power conversion system. For example, in embodiments, less than 50%, or less than 40% of the electrical power generated by the first generator passes through the power conversion system. The second converter section is electrically coupled between an electrical power output of the second generator and the coupling point such that in operation, the electrical power provided by the second generator to the coupling point passes through the power conversion system. In particular, all of the electrical power that is provided by the second generator to the coupling point may pass through the power conversion system such that a full converter system may be realized for the second generator.

As the stator winding of the first generator is coupled to the coupling point without passing through the power conversion system, an efficient power generation can be realized and conversion losses can be kept low. Such power generating system may accordingly provide a higher annual energy production than a full converter solution having a corresponding power rating. Furthermore, as the system may implement for the second generator a full converter (FC) solution, it is capable of providing reactive power over a wide operating range, thus ensuring that also demanding grid codes can be met. Even further, such power generating system can react to grid transients, since the electrical power conversion system that includes the second power converter section and that is coupled to the second generator may compensate such transients. Torque sharing can for example be implemented to reduce the effects of such transients on the first generator. The requirements for the mechanical design of the wind turbine components may thus be relaxed, resulting in reduced costs for mechanical and structural parts and therefore in reduced costs for the whole wind turbine. Furthermore, as it is possible to determine the relative power ratings of the first and second generators, the power generating system can be adapted efficiently for the respective site at which the wind turbine is to be installed. This allows the tuning of the properties of the wind turbine to the respective site, which can result in an even higher energy production of such wind turbine compared to a conventional DFIG solution.

Additionally, by implementing a full converter solution including the second generator, it becomes possible to operate the second generator as a motor, which is beneficial for example during maintenance (for turning the wind turbine rotor into a desired position). Such FC solution employing, e.g., a permanent magnet generator may also enable a black-start of the wind turbine when the grid is not available. Additionally, a wind turbine equipped with such electrical power generating system benefits from a higher availability and a reduced downtime, since it is possible to operate the wind turbine at a reduced power output in case of failure of one of the two generators or the associated converter section. Also, the power generating system allows the adaptation to different grid code requirements by selecting the power ratings of the first and second generators such that the respective grid code requirement can be met (for example, a higher rated second generator can be selected if the grid code requires higher reactive power providing capability over a wide operating range).

Such wind turbine electrical power generating system accordingly allows the levelized cost of electricity (LCOE) produced by such system to be reduced.

The coupling point is generally the point in the system at which the electrical power flow from the stator winding (which does not pass through the power conversion system) and the electrical power flow passing through the power conversion system are combined. It may for example be a connection point (e.g., at which respective electrical conductors are connected), or it may be a transformer at which the power flows are combined, for example by using different secondary windings, to one of which the stator winding is coupled or connected and to another one of which the output of the power conversion system is coupled or connected. In embodiments, the stator winding of the first generator may be directly connected to the coupling point without any intervening power converter. The coupling point is coupled between the power conversion system and the grid, i.e., generated electric power flows to the grid via the coupling point. It should also be clear that there may be other intervening elements (excluding a power converter) between the coupling point and the stator winding, and/or between the coupling point and the power conversion system, such as filters, circuit breakers, transformers or the like.

In an embodiment, the first generator is a doubly-fed induction generator (DFIG) and/or the second generator is a permanent magnet generator (PMG), in particular a permanent magnet synchronous generator (PMSG). By employing these different types of generators in the power generating system, the efficiency of energy production can be improved while at the same time, the system is flexible and can be adapted to the respective wind turbine site and grid code requirements.

The first power converter section may be a generator side converter providing AC/DC conversion and being configured to enable bi-directional power flow to control current in the rotor winding of the first generator. The first power converter section may thus provide an efficient power/torque control of the first generator. It may in particular control the active/reactive power generation by the first generator, for example by the stator winding. A respective converter controller may be comprised in the power generating system for controlling this first power converter section.

The second power converter section may be a generator side converter providing AC/DC conversion and forming a part of an AC/AC power converter implemented in the power conversion system, which is configured to provide AC/AC conversion of the electrical power generated by the second generator. The power conversion system may thus implement a full converter solution for the second generator.

It should be clear that the largest fraction of the electrical power generated by the second generator may pass through the second power converter section, for example more than 80%, 90%, or all of the generated power in embodiments. It should be clear that there may be some electrical losses or some power take-off prior to the generated electrical power reaching the second power converter section, however, such losses are only minor.

In an embodiment, the power conversion system comprises a DC bus and a grid side converter electrically coupled between the DC bus and the coupling point. The first power converter section is electrically coupled, in particular connected, between the first generator and the DC bus and the second power converter section is electrically coupled, in particular connected, between the second generator and the DC bus. The first and second power converter sections can thus be directly connected to the same DC bus. Accordingly, only a single grid side converter may be comprised in the power conversion system between the DC bus and the coupling point, thus reducing size, complexity and costs of the power conversion system. The first and second power converter sections are thus connected to the coupling point via the DC bus and the grid side converter.

In another embodiment, the power conversion system may include two separate grid side converters, each including a respective DC bus that is connected to the first or second grid side converter. Two independent AC/AC converters may be implemented in such configuration in the power conversion system. In such configuration, the grid side converters can be controlled independently for each generator.

The electrical power generating system may comprise a control system configured to control the first and second power converter sections. Such control system may for example be configured to operate the second generator as a motor, for example during service or maintenance operations. The second power converter section may for example be controlled so as to achieve a power flow towards the second generator to drive the second generator as a motor. The respective electrical power may be obtained from an energy storage system or from the grid.

The electrical power generating system may further comprise a brake chopper and/or an energy storage system coupled to a DC bus of the power conversion system. By such brake chopper, electrical energy may be dissipated, for example to dissipate power occurring during transients, or to dissipate excess energy generated by the first and/or second generator. By such energy storage system, electrical energy generated by the first and/or second generator can be stored, or the energy storage may be charged using electrical energy provided from the grid. The energy storage may for example be used for black-starting the wind turbine, or it may be used during maintenance to turn the rotor of the wind turbine using the second generator as a motor.

In particular, the second generator may allow a black-starting of the wind turbine, as a permanent magnet synchronous generator can generate voltage even if there is no power available from the grid. On the other hand, a conventional DFIG solution needs to have available power on the electrical grid in order to introduce stator voltage for start-up. In the present power generating system, power generated by the second generator may be used to introduce such stator voltage at start-up. Consequently, black-start of the wind turbine without availability of the power grid is enabled, and the cut-in speed of the first generator, in particular the DFIG, can be reduced.

The electrical power generating system may further comprise a transformer coupled between the coupling point and a power grid, and/or a transformer coupled between the first and/or second power converter section and the coupling point, depending on the configuration. A transformer having several secondary windings may for example be provided, wherein the stator of the first generator is coupled to one secondary winding, and the grid side converter of the power conversion system is coupled to a second of the secondary windings. The coupling point may then be the primary winding of such transformer where the electrical power generated by the stator of first generator and the electrical power passing through the power conversion system are brought together for transmission.

The power grid may for example be a local wind farm grid, a utility grid or an island grid or the like.

In an embodiment, the electrical power generating system further comprises a gearbox that is mechanically coupled between the rotor of the wind turbine and the first and second generators. For example, the first and second generators may be both driven by the same shaft of the gearbox. A conventional gearbox having a relatively simple design may thus be employed. The size of such power generating system, in particular in an axial direction thereof, may on the other hand be increased. As another example, the gearbox may have two rotational outputs, wherein a first output is coupled to the first generator and a second output is coupled to the second generator. Although the configuration of the gearbox is slightly more complex in such implementation, the power generating system is more compact and the space available in a nacelle of the wind turbine can be used more efficiently.

The first power converter section and the second power converter section may have a corresponding configuration, and/or they may be rated for the same power and/or for the same current level. A simplified system configuration may thus be achieved. For example, the power rating of the second generator may be comparable to the fraction of generated electrical power that is handled by the first power converter section, so that power converter sections of the same configuration can be employed. Furthermore, the grid side converter may likewise have a similar configuration and rating.

The power rating of the second generator may for example lie within a range of 10% to 30%, or 15% to 30%, or 17% to 25% of a power rating of the first generator. In such configuration, the efficiency of power generation can be kept high while a sufficient reactive power providing capability is achieved and grid transients can be handled without difficulty.

As an example, the first generator may have a power rating in a range of between 4 MW and 10 MW. The second generator may have a power rating in a range between about 0.5 to 3 MW.

The first and/or second power converter sections may include semiconductor switches for providing the power conversion. The semiconductor switches may for example be insulated gate bipolar transistors (IGBTs), thyristors, MOSFETs, silicon carbide (SiC) MOSFETs, or a combination thereof. In an embodiment, SiC MOSFETs may be employed. These have the advantage of providing low gate charge and low device capacitance levels. Also, they are able to provide temperature independent and low switching losses.

The first generator may be part of a DFIG module having a first output power rating, wherein the DFIG module is selected from plural DFIG modules having different power output ratings. Likewise, the second generator may be part of a PMSG module having a second output power rating, and the PMSG module may be selected from plural PMSG modules having different power output ratings. By such modular approach, where the configuration of the wind turbine electrical power generating system can be chosen from plural modules having different ratings, the power generating system can be adapted efficiently to the respective wind turbine site and to the grid code requirements for the respective grid connection.

The power generating system may further comprise a control system configured to control the electromagnetic torque of the first and second generators according to a torque sharing method. Upon occurrence of a transient on a power grid to which the power generating system is coupled, the torque sharing method controls the second generator so as to at least partially compensate the transient. The transient can thus be largely taken up by the second power converter section so that the torque changes experienced by the first generator can be kept relatively low. In particular, as a full converter solution is implemented for the second generator, full control is possible of the electrical parameters and the torque, so that the second generator can largely take up the torque resulting from such transient.

However, no full compensation of such transients is necessary, it is in particular not necessary to dissipate the full power of the transient. The wind turbine is generally designed to be capable of handling certain mechanical loads, for example during wind turbulences. Transients only have to be compensated up to a level such that the loading of the wind turbine is maintained at a level of mechanical turbulences for which the wind turbine is designed. Furthermore, energy can also be dissipated in brake choppers coupled to the power conversion system, as described above.

The control system may for example implement control modules or controllers for both generators, in particular the respective generator side converters, to provide torque control for the generators. An overall control unit (e.g., wind turbine controller) may for example provide torque set points to such converter controllers.

According to a further embodiment of the invention, a wind turbine comprising a rotor and an electrical power generating system having any of the configurations described herein is provided. By such wind turbine, advantages similar to the ones outlined further above may be achieved.

A further embodiment of the invention provides a method of providing a wind turbine with an electrical power generating system.

The method comprises the steps of providing a first generator of the electrical power generating system; mechanically coupling the first generator to a rotor of the wind turbine so as to receive rotational mechanical energy from the rotor; providing a second generator of the electrical power generating system; mechanically coupling the second generator to the rotor of the wind turbine so as to receive rotational mechanical energy from the rotor; electrically coupling a first power converter section of an electrical power conversion system between a rotor winding of the first generator and a coupling point and electrically coupling a stator winding of the first generator to the coupling point such that in operation, only a fraction of electrical power generated by the first generator passes through the power conversion system; and electrically coupling a second power converter section of the electrical power conversion system between an electrical power output of the second generator and the coupling point such that in operation, the electrical power provided by the second generator to the coupling point passes through the power conversion system. By such method, advantages similar to the ones outlined further above may be achieved.

It should be clear that the method may be performed with an electrical power generating system in any of the configurations described herein. Further, the method may include any of the steps described herein with respect to the electrical power generating system or that are implied in the assembly or operation thereof.

In an embodiment of the method, the first generator is part of a DFIG module having a first output power rating, and the second generator is part of a PMSG module having a second output power rating, wherein the steps of providing the first generator and providing the second generator comprise determining a target for one or more operating parameters of the electrical power generating system; selecting the DFIG module from plural DFIG modules having different power output ratings; and selecting the PMSG module from plural PMSG modules having different power output ratings. The selecting is performed such that the electrical power generating system that includes the selected DFIG module and the selected PMSG module achieves the target for the respective one or more operating parameters. By such method it becomes possible to provide a power generating system that is well adapted for the respective wind turbine site and/or the applicable grid code requirements. Furthermore, such adaptation becomes possible at relatively low costs since plural modules are provided that can be selected to achieve the desired characteristics.

For example, the target may be a range for a parameter, or maximum or minimum value for such parameter. As an example, an active power output value or range may be specified, and a minimum reactive power providing capability may be specified as targets. The power rating of the DFIG module and of the PSMG module can then be selected to achieve these targets (e.g., the combined power rating is matched to the target power rating, and the relative rating between the two modules is shifted towards the PMSG module if higher reactive power capability is desired).

In an embodiment, the first output power rating may be larger than the second output power rating. A higher power generating efficiency of the power generating system may thus be achieved.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

Figure 1:
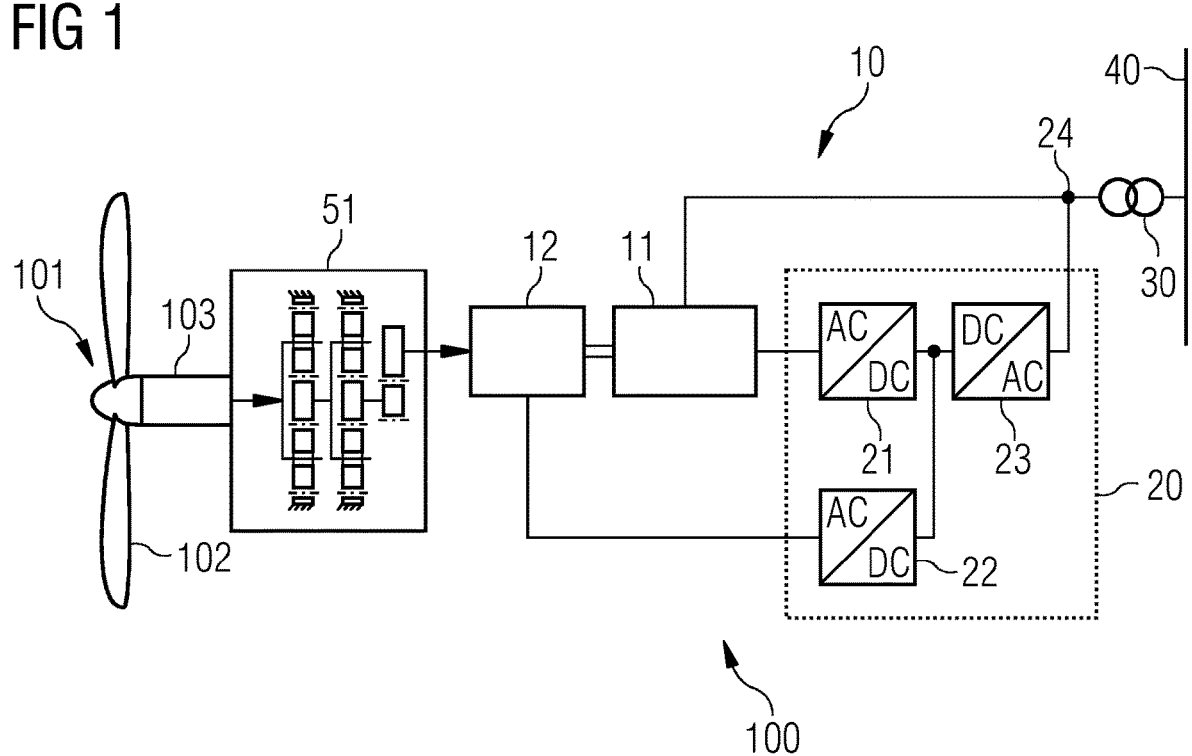
FIG. 1 is a schematic diagram showing a wind turbine electrical power generating system according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically illustrates a wind turbine 100 that includes a rotor 101 with rotor blades 102. The rotor 101 converts wind energy into rotational mechanical energy that is provided via a rotating shaft 103 to a gearbox 51. The wind turbine 100 includes an electrical power generating system 10 that receives the rotational mechanical energy from the rotor 101 via the gearbox 51.

The electrical power generating system 10 includes a first generator 11 and a second generator 12 that both are coupled mechanically to the rotor 101 via the gearbox 51. In the example of FIG. 1, the gearbox 51 has a single rotational output, and both generators 11, 12 are coupled to the same shaft connected to the output of the gearbox. Accordingly, both generators are rotated as the rotor 101 of the wind turbine 100 rotates.

The electrical power generating system 10 includes an electrical power conversion system 20, which includes a first power converter section 21 for the first generator 11 and a second power converter section 22 for the second generator 12. These are implemented as respective generator side converters and may provide full bi-directional AC/DC power conversion. Power conversion system 20 furthermore includes a grid side converter 23. The first power converter section 21 is (directly) connected to a rotor winding 13 of the first generator 11 and is, via the grid side converter 23, connected to a coupling point 24. A stator 14 of the first generator 11 is (directly) connected to the coupling point 24. In particular, no power converter is connected between the stator and the coupling point 24.

The first generator 11 is in particular a doubly-fed induction generator (DFIG), the rotor currents of which can be controlled by the generator side converter 21. The DFIG provides efficient power production as the stator is directly connected to the coupling point 24, which is coupled to the grid 40. Grid 40 can be a utility grid, a local wind farm grid, an island grid or the like. It should be clear that the electrical power generating system 20 may include a transformer 30 that can be a wind turbine transformer, and further transformers may be provided in the connection towards grid 40.

The first generator 11, the first converter section 21 and the grid side converter 23 thus may provide a DFIG solution that can be operated in any conventional way.

The electrical power output of the second generator 12 is (directly) connected to the second power converter section 22 of the power conversion system 20. The second power converter section 22 is similarly connected via the grid side converter 23 to the coupling point 24. The second power converter section 22 again is a generator side converter providing AC/DC conversion, and it may be configured similarly to the first power converter section 21. The second power converter section 22 and the grid side converter 23 thus provide a full AC/AC converter that is connected to the electrical power output of the second generator 12 and that converts all of the electrical power generated by this second generator 12. The second generator 12, the second power converter section 22 and the grid side converter 23 thus may implement a full converter solution which can be operated in any known way.

The second generator 12 may in particular be a permanent magnet generator (PMG), in particular a permanent magnet synchronous generator (PMSG).

The power conversion system 20 thus implements an AC/AC converter for the first generator 11 and an AC/AC converter for the second generator 12. In the example of FIG. 1, only a single grid side converter 23 is provided, and the DC side of the first and second power converter sections 21, 22 are coupled to the same DC bus 25 (see FIGS. 3 and 4). It should be clear that in other implementations, a second grid side converter 23 may be provided and separate DC buses may be included in the power conversion system 20, so that two separate AC/AC converters are obtained. The output of such two separate AC/AC converters may be joined before joining with the output of the stator winding of the first generator 11, or the outputs of the stator winding and the AC/AC converter associated with the first generator may be joined first prior to joining with the output of the AC/AC converter associated with the second generator.

In any of the configurations, the coupling point 24 may in particular be the point at which the power flows of generated electrical power from the three power outputs are finally joined (power output of the stator winding, power output of the rotor winding, and power output of the second generator).

In the example of FIG. 1, the output of the power conversion system 20 is joined to the output of the stator winding of the first generator 11 prior to the transformer 30. It should be clear that other configurations are conceivable. For example, in conventional DFIG systems, a transformer having two secondary windings may be employed, and the stator winding is coupled to one secondary winding while the rotor winding of the generator is coupled to a different secondary winding. Such configuration may likewise be employed here, wherein the stator winding and the output of the power conversion system 20 may be coupled to different secondary windings of the same transformer. The coupling point may then be on the primary side of such transformer (i.e., on the grid side).

The power rating of the second generator 12 may be lower than that of the first generator 11. For example, the second generator 12 may convert 10% to 30% of the mechanical power while the first generator 11 may convert between about 90% to 70% of the mechanical power. Accordingly, first generator 11 may be designated as a main generator and second generator 12 may be designated as an auxiliary generator. By such configuration, an overall high efficiency of power generation can be achieved, since the stator of the first generator 11 is directly coupled to the coupling point 24 without power losses by an intervening power converter.

Furthermore, the full converter solution that is implemented by the second generator 12 and the respective components of the power conversion system 20 has the capability of providing the desired reactive power over wide operating ranges. As the output of the second generator 12 is fully converted by the power conversion system 20, sufficient reactive power can be provided (generated or consumed) over a large range of wind speeds.

Furthermore, in the case of grid events, the associated torque can be largely taken up by the second generator 12. The mechanical load on the first generator 11 and thus on the wind turbine in general can thereby be reduced.

Furthermore, the first generator 12 also allows motor operation, so that the rotor 101 of the wind turbine may be rotated to a desired angle by employing power received from the grid or from a local storage, thereby facilitating maintenance work on the wind turbine 100.

Figure 2:
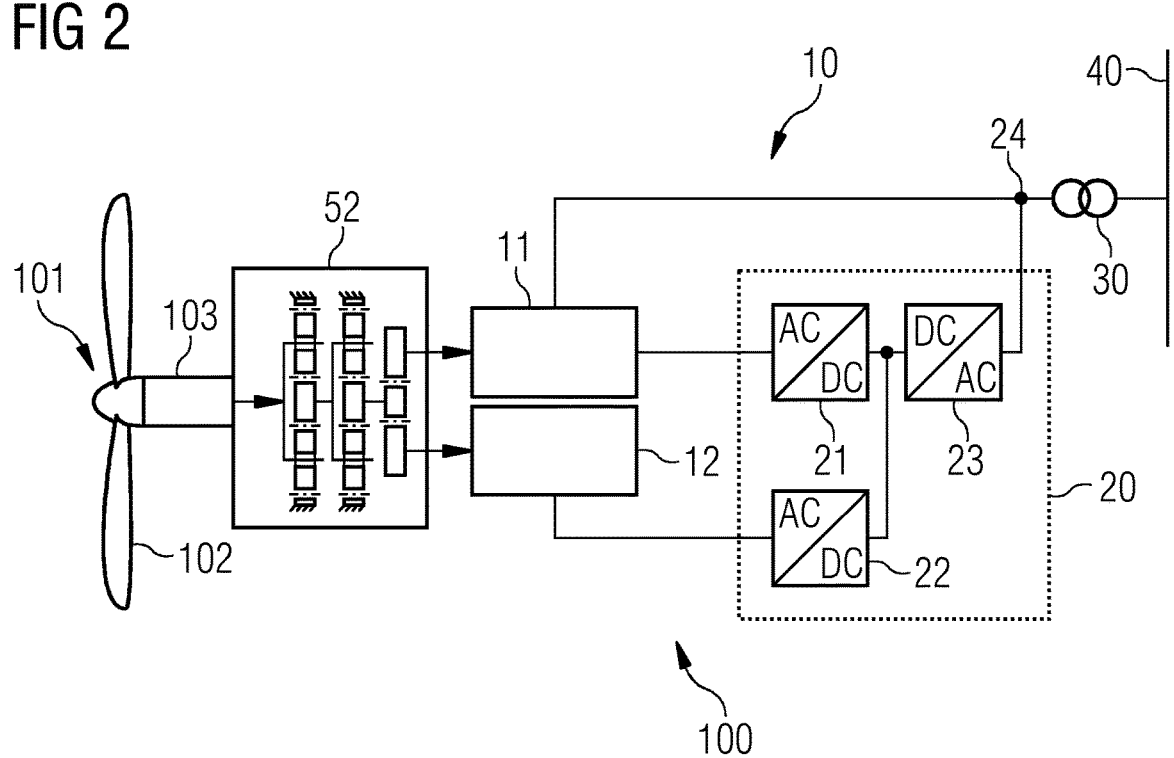
FIG. 2 is a schematic drawing showing a wind turbine electrical power generating system according to an embodiment of the invention.

FIG. 2 illustrates a modification of the system of FIG. 1, so that the above explanations are equally applicable to the implementation shown in FIG. 2 and only differences will be explained. In the embodiment of FIG. 2, a gearbox 52 having two rotational outputs is provided. The first and second generators 11, 12 are accordingly not coupled to the same shaft, but they are coupled to the two different outputs of the gearbox. Although the complexity of the gearbox is increased in such system, the space available in a nacelle of the wind turbine 100 can be used more efficiently in such solution. Gearboxes having two or more outputs are commonly available and will not be explained in greater detail here.

Figure 3:
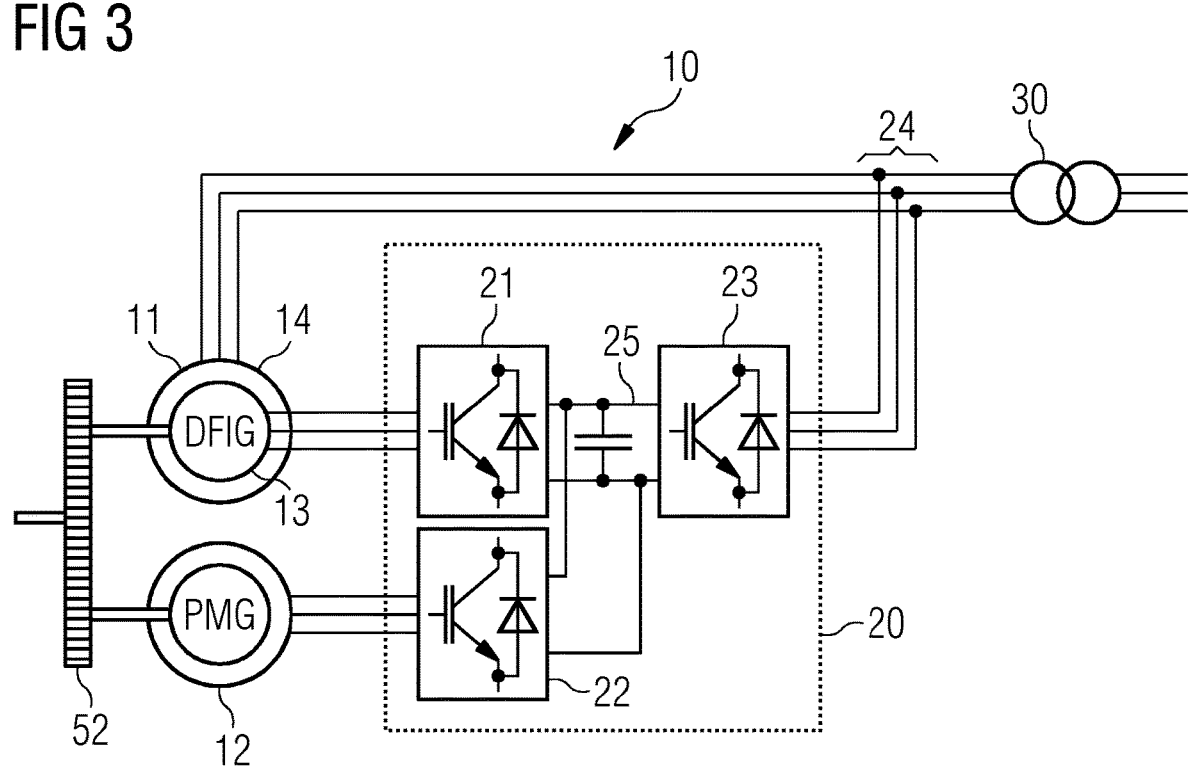
FIG. 3 is a schematic diagram showing a wind turbine electrical power generating system according to an embodiment of the invention.

FIG. 3 illustrates the electrical implementation of the system of FIG. 2 in more detail. Although in FIG. 3, a gearbox 52 having two outputs is employed, it should be clear that the electrical configuration of FIG. 3 is likewise applicable to the embodiment of FIG. 1 in which both generators 11, 12 are coupled to the same output of gearbox 51. As illustrated in FIG. 3, the first generator 11 is a DFIG that has a rotor 13 and a stator 14. The first power converter section 21 is coupled to rotor 13, whereas the coupling point 24 is connected to the stator 14 without any intervening power converters. It should be clear that the term "power conversion" herein relates to frequency conversion, in particular AC/DC, DC/AC and AC/AC conversion, and not to transformers. As outlined above, a transformer or transformer winding may be present between the stator 14 and the coupling point 24.

As illustrated, the grid side converter 23 and the generator side converters 21, 22 can be implemented by semiconductor switches, in particular using IGBTs. Other implementations may also be conceivable, such as making use of thyristors or MOSFETs. A particular beneficial implementation is the use of silicone carbide (SiC) MOSFETs.

As further illustrated in FIG. 3, the first and second power converter sections 21, 22 are connected to the same DC bus 25. The grid side converter 23 is connected between the DC bus 25 and the coupling point 24.

Figure 4:
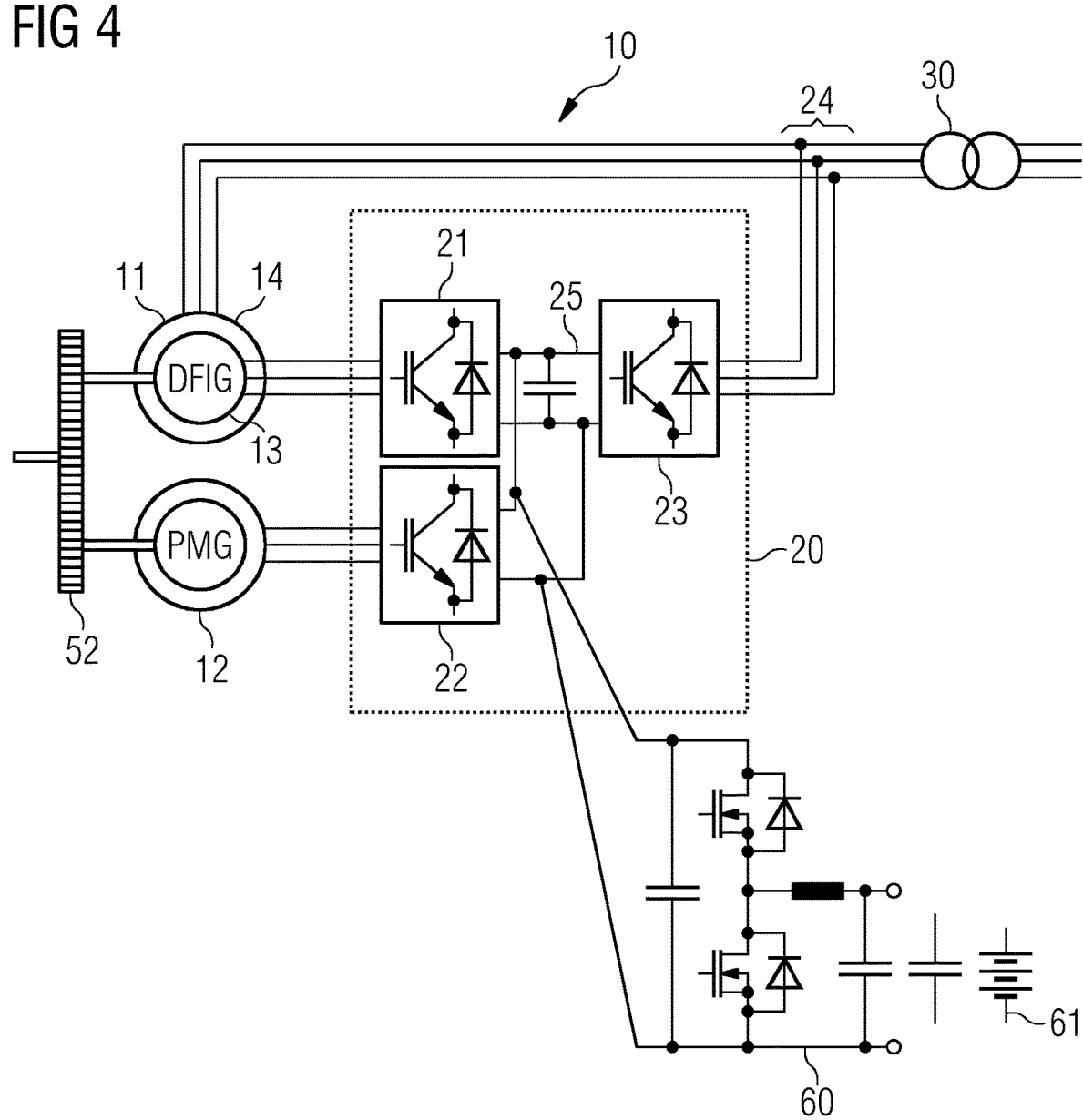
FIG. 4 is a schematic diagram showing a wind turbine electrical power generating system according to an embodiment of the invention.

FIG. 4 illustrates a modification of the system 10 of FIG. 3. It should be clear that these modifications are equally applicable to the electrical power generating systems 10 of FIGS. 1 and 2. In the system of FIG. 4, an energy storage system 60 is furthermore provided and is connected to the DC bus 25. Energy storage system 60 can form part of the wind turbine 100 and may form part of the power generating system 10. The energy storage system 60 includes a storage element 61 that may for example be implemented as a ultra-capacitor, an electrochemical battery, or any other known energy storage element as indicated in FIG. 4. The energy storage system 60 provides sufficient power for black-starting the wind turbine. As the power generating system 10 includes the permanent magnet generator 12, it is capable of black-starting using only little power from power storage system 60. Conventional DFIG systems require power from the power grid in order to introduce a stator voltage at start-up. In the system of FIG. 4, such grid voltage is not required, as the second generator 12 is capable of producing energy even when such grid voltage is not present, and can accordingly provide the voltage that is required for starting-up the DFIG 11.

In general, the power generating system of the embodiments described herein allow operation with a lower cut-in speed for the DFIG 11, as the PMG 12 can produce the required start-up voltage at start-up, so that overall, a higher energy production can be achieved.

Figure 5:
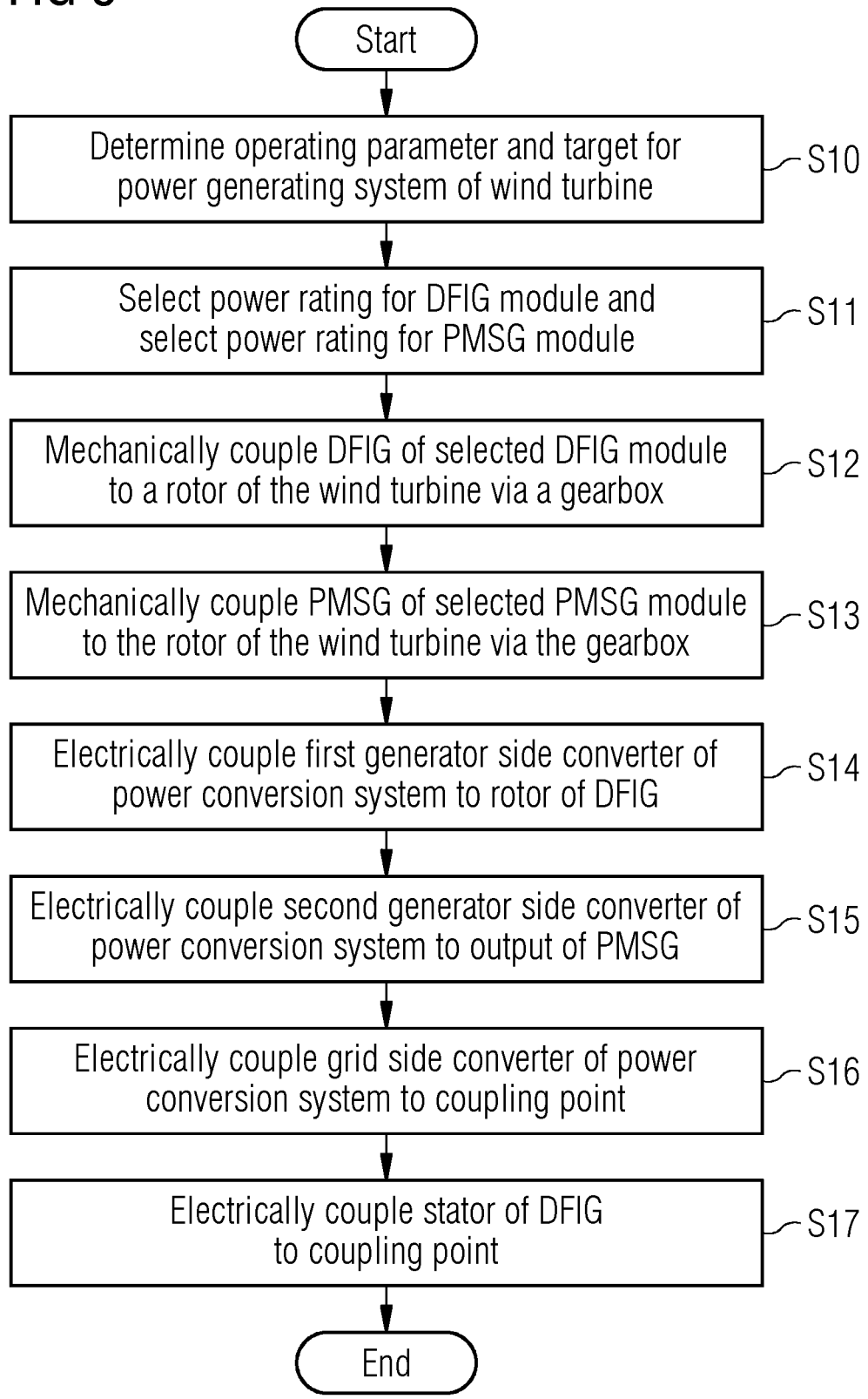
FIG. 5 is a schematic flow diagram illustrating a method according to an embodiment of the invention.

FIG. 5 shows a flow-diagram illustrating a method of providing a wind turbine with an electrical power generating system which may have any of the configurations described herein. As outlined above, it is possible to select different power ratings for the first and second generators 11, 12, and thus to adjust certain operating characteristics of the power generating system 10 as desired by the operator. These include for example the active power generating efficiency and rating, reactive power providing capability, and tolerance to grid transients.

For example, an operating parameter and a respective target for such operating parameter of the power generating system 20 may be determined (step S10). These may for example include a desired total power rating of the overall system 10 and a certain reactive power providing capability, or the like. The first and second generators may be provided as respective modules of a predetermined power rating, in the particular example as DFIG module or PMSG module. An example is shown in the tables 1 and 2 below for different power ratings of the DFIG system and of the PMSG (or FC) system. These respective "modules" can be provided and can be standardized, so that it becomes possible to configure a plurality of different systems having different desired properties by making use of only a limited number of pre-designed components. Accordingly, standardization of the components for different platforms becomes possible, resulting in reduced complexity and costs.

TABLE 1 power ratings and torque ratings for different DFIG systems
DFIG System

|  | 4.5 MW to 5 MW | 5.5 MW to 6 MW | 7 MW to 7.5 MW | 8 MW to 9 MW |
|---|---|---|---|---|
| Power rating | | | | |
| Rated Torque | 40 kNm | 50 kNm | 60 kNm | 70 kNm |

TABLE 2 power ratings and torque ratings for different PMSG systems
PMSG System

|  | 0.5 MW to 0.75 MW | 1 MW to 1.5 MW | 1.5 MW to 2 MW | 2 MW to 2.5 MW |
|---|---|---|---|---|
| Power rating | | | | |
| Rated Torque | 5 kNm | 10 kNm | 15 kNm | 20 kNm |

In step S11, the power rating for the DFIG module and the power rating for the PMSG module is selected. In particular, the modules may be selected from the modules shown in the tables 1 and 2 above.

In step S12, the generator of the selected DFIG module is mechanically coupled to the rotor of the wind turbine via the respective gearbox 51, 52. The generator of the selected PMSG module is mechanically coupled to the rotor of the wind turbine via the respective gearbox 51, 52 in step S13. The rotor of the first generator 11 is then electrically coupled to the first generator side converter 21 (step S14) and the output of the second generator is electrically coupled to the second generator side converter (step S15). The grid side converter is electrically coupled to the coupling point 24 in step S16 (which, as outlined above, may also include the coupling via a transformer or transformer winding). In step S17, the stator of the first generator 11 is coupled to the coupling point 24 (again, as outlined above, such coupling may occur via a transformer or transformer winding).

Accordingly, by such method, a power generating system 10 and/or a wind turbine 100 in any of the above-described configurations may be provided. It should be clear that the order of the method steps may be changed.

By such method, a platform synergy and thus a facilitated and less complex designing of new power generating systems 20 can be achieved. Furthermore, a site adaptability in which the properties of each individual wind turbine can be adapted for the respective installation site is achieved. Likewise, it is possible to adapt the electrical properties of the individual wind turbine in a fast and efficient way to the respective grid code requirements. For example, if more reactive power is required to be made available towards the grid, the power rating of the second generator 12 may be increased.

As outlined above, the power generating system 10 described herein has several advantages. It is not only more efficient with respect to electrical power production than conventional systems, but it provides at the same time a flexibility with respect to the reactive power providing capability and the adaptability of the wind turbine to the respective installation site. The power ratings of the first and second generators can be balanced to reach the desired properties. Overall, an improved levelized cost of electricity (LCOE) can be achieved. Costs can be kept low, in particular since in view of the improved capability to handle transients on the power grid, the mechanical and structural requirements of wind turbine components can be relaxed.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine electrical power generating system, comprising:
   a first generator configured to be mechanically coupled to a rotor of a wind turbine to receive rotational mechanical energy from the rotor;
   a second generator configured to be mechanically coupled to the rotor of the wind turbine to receive rotational mechanical energy from the rotor; and an electrical power conversion system including at least a first power converter section and a second power converter section, wherein the first power converter section is electrically coupled between a rotor winding of the first generator and a coupling point and wherein a stator winding of the first generator is electrically coupled to the coupling point such that in operation, only a fraction of electrical power generated by the first generator passes through the power conversion system, wherein electrical coupling between the stator winding of the first generator and the coupling point bypasses the power conversion system, and wherein the second power converter section is electrically coupled between an electrical power output of the second generator and the coupling point such that in operation, the electrical power provided by the second generator to the coupling point passes through the power conversion system.

2. The electrical power generating system according to claim 1, wherein the first generator is a doubly-fed induction generator, and/or wherein the second generator is a permanent magnet generator.

3. The electrical power generating system according to claim 1, wherein the first power converter section is a generator side converter providing AC-DC conversion and being configured to enable bi-directional power flow to control current in the rotor winding of the first generator.

4. The electrical power generating system according to claim 1, wherein the second power converter section is a generator side converter providing AC-DC conversion and being configured to enable bi-directional power flow and forming a part of an AC-AC bidirectional power converter implemented in the power conversion system.

5. The electrical power generating system according to claim 1, wherein the power conversion system comprises a DC bus and a grid side converter electrically coupled between the DC bus and the coupling point, wherein the first power converter section is electrically coupled between the first generator and the DC bus and the second power converter section is electrically coupled between the second generator and the DC bus.

6. The electrical power generating system according to claim 1, further comprising a brake chopper and/or an energy storage system coupled to a DC bus of the power conversion system.

7. The electrical power generating system according to claim 1, further comprising a gearbox mechanically coupled between the rotor of the wind turbine and the first and second generators.

8. The electrical power generating system according to claim 7, wherein the first and second generators are both driven by the same shaft of the gearbox.

9. The electrical power generating system according to claim 7, wherein the gearbox has two rotational outputs, a first output being coupled to the first generator and a second output being coupled to the second generator.

10. The electrical power generating system according to claim 1, wherein the first and second power converter sections have a corresponding configuration and/or are rated for the same power or current level.

11. The electrical power generating system according to claim 1, wherein a power rating of the second generator lies within a range of 10% to 40% of a power rating of the first generator.

12. The electrical power generating system according to claim 1, further comprising a control system configured to control electromagnetic torque of the first and second generators (according to a torque sharing method, wherein upon occurrence of a transient on a power grid to which the power generating system is coupled, the torque sharing method controls the second generator so as to at least partially compensate the transient.

13. A wind turbine comprising:
a rotor;
a first generator mechanically coupled to the rotor;
a second generator mechanically coupled to the rotor; and
an electrical power conversion system including at least a first power converter section and a second power converter section,
wherein the first power converter section is electrically coupled between a rotor winding of the first generator and a coupling point and wherein a stator winding of the first generator is electrically coupled to the coupling point such that in operation, only a fraction of electrical power generated by the first generator passes through the power conversion system, wherein electrical coupling between the stator winding of the first generator and the coupling point bypasses the power conversion system, and
wherein the second power converter section is electrically coupled between an electrical power output of the second generator and the coupling point such that in operation, the electrical power provided by the second generator to the coupling point passes through the power conversion system.

14. A method of providing a wind turbine with an electrical power generating system, comprising:
providing a first generator of the electrical power generating system;
mechanically coupling the first generator to a rotor of the wind turbine so as to receive rotational mechanical energy from the rotor;
providing a second generator of the electrical power generating system;
mechanically coupling the second generator to the rotor of the wind turbine so as to receive rotational mechanical energy from the rotor;
electrically coupling a first power converter section of an electrical power conversion system between a rotor winding of the first generator and a coupling point and electrically coupling a stator winding of the first generator to the coupling point such that in operation, only a fraction of electrical power generated by the first generator passes through the power conversion system, wherein electrical coupling between the stator winding of the first generator and the coupling point bypasses the power conversion system; and
electrically coupling a second power converter section of the electrical power conversion system between an electrical power output of the second generator and the coupling point such that in operation, the electrical power provided by the second generator to the coupling point passes through the power conversion system.

15. The method of claim 14, wherein the first generator is part of a doubly-fed induction generator, DFIG, module having a first output power rating, and wherein the second generator is part of a permanent magnet synchronous generator, PMSG, module having a second output power rating, wherein providing the first generator and providing the second generator comprise:
determining a target for one or more operating parameters of the electrical power generating system;

selecting the DFIG module from plural DFIG modules having different power output ratings; and
selecting the PMSG module from plural PMSG modules having different power output ratings,
wherein the selecting are performed such that the electrical power generating system that includes the selected DFIG module and the selected PMSG module achieves the target for the respective one or more operating parameters.

\* \* \* \* \*